(12) United States Patent
Takahashi et al.

(10) Patent No.: US 8,680,208 B2
(45) Date of Patent: Mar. 25, 2014

(54) STAR POLYMER

(75) Inventors: Eiji Takahashi, Chiba (JP); Syoji Yamaguchi, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 64 days.

(21) Appl. No.: 13/261,163

(22) PCT Filed: Aug. 4, 2010

(86) PCT No.: PCT/JP2010/004895
§ 371 (c)(1),
(2), (4) Date: Jan. 31, 2012

(87) PCT Pub. No.: WO2011/016227
PCT Pub. Date: Feb. 10, 2011

(65) Prior Publication Data
US 2012/0130038 A1 May 24, 2012

(30) Foreign Application Priority Data
Aug. 4, 2009 (JP) .................................. 2009-181231

(51) Int. Cl.
C08F 293/00 (2006.01)
C08F 220/18 (2006.01)
C08F 220/20 (2006.01)
C08F 212/08 (2006.01)

(52) U.S. Cl.
USPC .......................... 525/316; 525/299; 526/323.2

(58) Field of Classification Search
USPC ................. 526/323.2; 525/299, 316
See application file for complete search history.

(56) References Cited

U.S. PATENT DOCUMENTS

| | | | | |
|---|---|---|---|---|
| 5,756,585 A | * | 5/1998 | Teyssie et al. | ................ 525/299 |
| 6,013,735 A | | 1/2000 | Mishra et al. | |
| 2007/0244018 A1 | | 10/2007 | Visger et al. | |
| 2009/0118150 A1 | | 5/2009 | Baum et al. | |
| 2009/0239080 A1 | | 9/2009 | Ito et al. | |

FOREIGN PATENT DOCUMENTS

| | | |
|---|---|---|
| EP | 1 892 255 A1 | 2/2008 |
| JP | 05-500827 A | 2/1993 |
| JP | 11-286520 A | 10/1999 |
| JP | 2006-070229 A | 3/2006 |
| JP | 2008-518051 A | 5/2008 |
| JP | 2008-518052 A | 5/2008 |
| WO | WO 91/00882 A1 | 1/1991 |
| WO | WO 2006/047393 A1 | 5/2006 |
| WO | WO 2006/047398 A2 | 5/2006 |
| WO | WO 2006/134925 A1 | 12/2006 |
| WO | WO 2008/026401 A1 | 3/2008 |

* cited by examiner

Primary Examiner — Vu A Nguyen
(74) Attorney, Agent, or Firm — Foley & Lardner LLP

(57) ABSTRACT

It is an object of the present invention to provide a copolymer for a cured product that is satisfactory in properties, such as adhesion properties, as a chip stacking adhesive or the like. The present invention is a star polymer comprising, as an arm portion, a polymer chain containing repeating units represented by formula (I) and formula (II), and comprising a core portion derived from a monomer represented by formula (III), wherein a molar ratio of the repeating unit represented by formula (I) to the repeating unit represented by formula (II) ((I)/(II)) in the arm portion is in the range of 60/40 to 95/5.

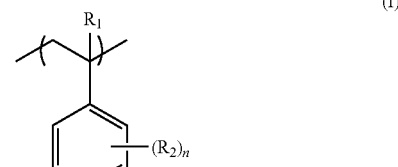

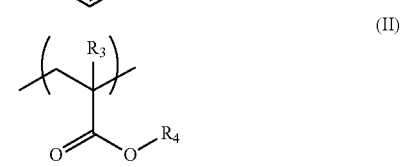

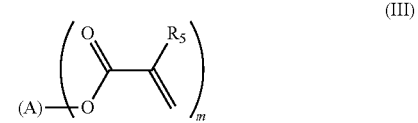

5 Claims, No Drawings

STAR POLYMER

TECHNICAL FIELD

The present invention relates to a star polymer suitable for insulating resin compositions used for surface protection films, interlayer insulating films, chip stacking adhesives, and the like for semiconductor devices and the like.

CROSS-REFERENCE TO RELATED APPLICATIONS

This application is a National Stage application of PCT/JP2010/004895, filed Aug. 4, 2010, which claims priority to Japanese Patent Application No. 2009-181231 filed on Aug. 4, 2009, the content of which is incorporated herein.

BACKGROUND ART

As a polymer for a cured product that is excellent in properties, such as electrical insulation properties, thermal shock resistance, and adhesion properties, a copolymer (A) having 10 to 99 mole % of a structural unit (A1) represented by the following formula (I) and 90 to 1 mole % of a structural unit (A2) represented by the following formula (2) (provided that the total of all constituent units constituting the copolymer (A) is 100 mole %) is known (see Patent Document 1).

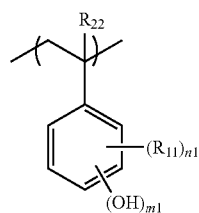

(1)

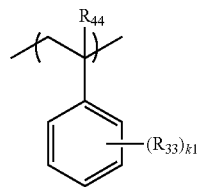

(2)

(wherein $R_{11}$ and $R_{33}$ each independently represent an alkyl group having 1 to 4 carbon atoms, an alkoxy group, or an aryl group, $R_{22}$ and $R_{44}$ each independently represent a hydrogen atom or a methyl group, m1 represents an integer of 1 to 3, n1 and k1 each independently represent an integer of 0 to 3, and m1+n1≤5.)

More specifically, a copolymer (Mw=10,000, Mw/Mn=3.5) consisting of p-hydroxystyrene/styrene/methyl methacrylate=80/10/10 (molar ratio) is described.

In addition, as a star polymer having an arm portion in which a polymer chain comprising styrene and (meth)acrylate as monomers is block-bonded and consisting of a core portion derived from a polyacrylate, a polymer represented by the following formula (3):

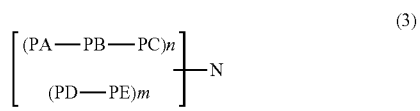

(wherein PA represents a polymer block derived from at least one monomer A selected from among aromatic vinyl monomers and the like,
PB represents a polymer block derived from at least one acrylic monomer B,
PC represents a polymer block derived from at least one monomer C present as required, selected from methacrylic monomers, or the like,
PD represents a polymer block derived from at least one monomer D selected from among aromatic vinyl monomers and methacrylic monomers, and PE represents a polymer block derived from at least one acrylic monomer E, or the like,
n represents 2 to 20,
m represents 0 to 18,
n+m does not exceed 20, and
N represents a crosslinked nodule of at least one polymerized monomer Mr, this monomer Mr being composed of a polyfunctional crosslinking agent having at least two polymerizable double bonds in one molecule,) is known (see Patent Document 2).

PRIOR ART DOCUMENTS

Patent Documents

Patent Document 1: WO2008/026401
Patent Document 2: Japanese Unexamined Patent Application Publication (Translation of PCT Application) No. 5-500827

SUMMARY OF THE INVENTION

Object to be Solved by the Invention

A problem of the copolymer disclosed in Patent Document 1 is that satisfactory properties as a chip stacking adhesive are not necessarily obtained.

In addition, for the star polymer disclosed in Patent Document 2, its uses are not disclosed, and satisfactory physical property values are not obtained in heat resistance, crack resistance, and the like.

It is an object of the present invention to provide a copolymer for a cured product that is satisfactory in properties as a chip stacking adhesive or the like, such as heat resistance, crack resistance, high temperature adhesiveness, and adhesion properties.

Means to Solve the Object

The present inventors have studied diligently to solve the above object, and, as a result, found that a polymer satisfying the above properties is obtained by fabricating a star polymer comprising a polymer chain having a particular amount or more of a repeating unit of an aryl moiety and a repeating unit of an acrylic acid moiety, as an arm portion, and a polymer chain derived from a polyacrylate, as a core portion, leading to the completion of the present invention.

Specifically, the present invention relates to a star polymer comprising, as an arm portion, a polymer chain containing repeating units represented by formula (I) and formula (II):

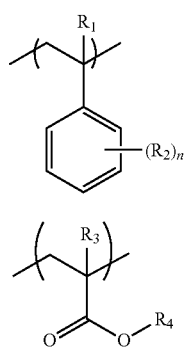

(wherein $R_1$ and $R_3$ each independently represents a hydrogen atom or a methyl group, $R_2$ represents an alkyl group, an alkoxy group, or an aryl group, $R_4$ represents an alkyl group which may have a hydroxy group, or a cycloalkyl group, and n represents any integer of 0 to 3), and comprising a core portion derived from a monomer represented by formula (III):

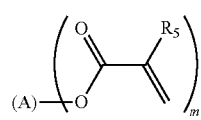

(wherein (A) represents an m-valent linking group, $R_5$ represents a hydrogen atom or a methyl group, and m represents an integer of 2 or more), wherein a molar ratio of the repeating unit represented by formula (I) to the repeating unit represented by formula (II) ((I)/(II)) in the arm portion is in the range of 60/40 to 95/5.

It is preferable that the molar ratio of the repeating unit represented by formula (I) to the repeating unit represented by formula (II) ((I)/(II)) in the arm portion be in the range of 80/20 to 95/5.

It is preferable that the repeating unit represented by formula (I) and the repeating unit represented by formula (II) be bonded by block bonding.

It is preferable that styrene equivalent weight-average molecular weight measured by gel permeation chromatography be in the range of 50,000 to 200,000.

Further, it is preferable that a ratio of styrene equivalent weight-average molecular weight (Mw) and number-average molecular weight (Mn) measured by gel permeation chromatography (Mw/Mn) be in the range of 1.01 to 1.50.

MODE OF CARRYING OUT THE INVENTION

The star polymer of the present invention comprises a polymer chain containing repeating units represented by formula (I) and formula (II), as an arm portion, wherein the repeating unit represented by formula (I) in the arm portion is 60 mole % or more, preferably 80 mole % or more, with respect to the entire arm portion.

In formula (I), $R_1$ represents a hydrogen atom or a methyl group.

In formula (I), $R_2$ represents an alkyl group, an alkoxy group, or an aryl group. Specific examples thereof can include an alkyl group such as methyl group, ethyl group, n-propyl group, isopropyl group, n-butyl group, isobutyl group, s-butyl group, t-butyl group, n-pentyl group, isopentyl group, s-pentyl group, t-pentyl group, neopentyl group, n-hexyl group, n-heptyl group, n-octyl group, n-nonyl group, or n-decyl group, an alkoxy group such as methoxy group, ethoxy group, n-propoxy group, isopropoxy group, n-butoxy group, isobutoxy group, s-butoxy group, t-butoxy group, n-pentoxy group, isopentoxy group, s-pentoxy group, t-pentoxy group, neopentoxy group, n-hexyloxy group, n-heptyloxy group, n-octyloxy group, n-nonyloxy group, or n-decyloxy group, or an aryl group such as phenyl group, 4-chlorophenyl group, 4-methylphenyl group, 1-naphthyl group, or 2-naphthyl group.

n represents any integer of 0 to 3.

In formula (II), $R_3$ represents a hydrogen atom or a methyl group. $R_4$ represents an alkyl group which may have a hydroxy group or a cycloalkyl group. Specific examples thereof can include specific examples similar to those of the alkyl group of $R_2$, and alkyl groups which may have a hydroxy group, such as 2-hydroxyethyl group, 3-hydroxypropyl group, and 2,2-dimethyl-3-hydroxypropyl group, and cycloalkyl groups such as cyclopropyl group, cyclobutyl group, cyclopentyl group, cyclohexyl group, 1-ethylcyclohexyl group, norbornyl group, dicyclopentanyl group, tricyclodecanyl group, 1-adamantyl group, and isoboronyl group.

In formula (III), (A) represents an m-valent linking group, Specific examples thereof can include chemical structures shown below:

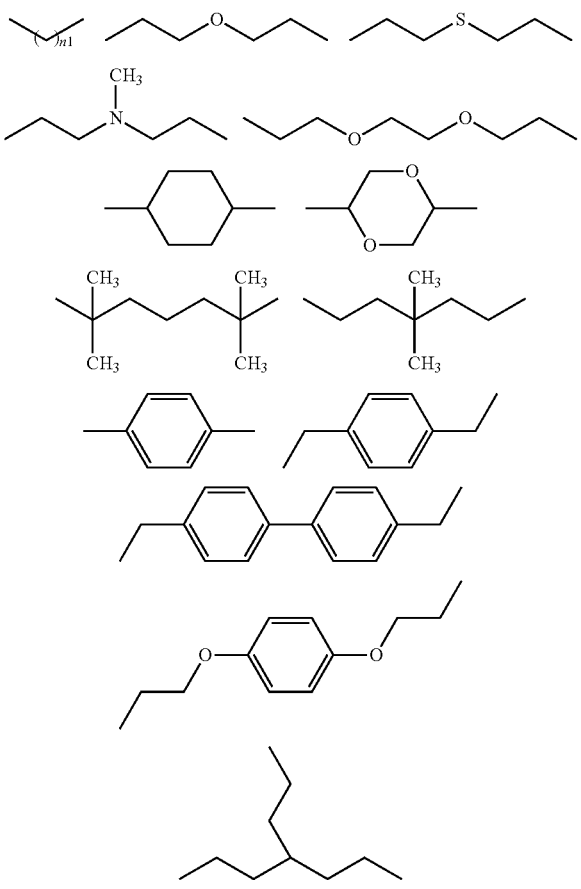

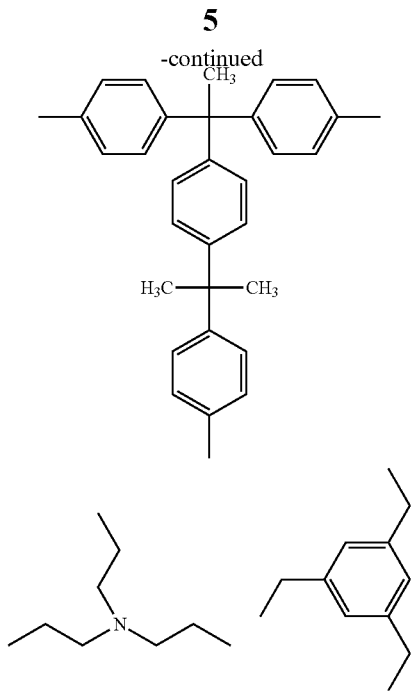

(wherein n1 represents any integer, preferably any integer of 1 to 6).

In formula (III), $R_5$ represents a hydrogen atom or a methyl group, and m represents an integer of 2 or more, preferably 2 or 3.

Specific examples of the compound represented by formula (III) can include ethylene glycol dimethacrylate, 1,3-butylene glycol dimethacrylate, 1,4-butylene glycol dimethacrylate, ethylene glycol diacrylate, 1,3-butylene glycol diacrylate, 1,4-butylene glycol diacrylate, or trimethylolpropane trimethacrylate.

The molar ratio of the repeating unit represented by formula (I) to the repeating unit represented by formula (II) ((I)/(II)) in the arm portion is preferably 60/40 to 95/5, further preferably 80/20 to 95/5. If the repeating unit represented by formula (I) is less than 60 mole %, the heat resistance of the star polymer is insufficient. If the repeating unit represented by formula (II) is less than 5 mole %, a problem is that the crack resistance of the star polymer is insufficient. It is preferable that the star polymer have a microphase separation structure as a whole. For this purpose, the above range of the molar ratio is preferred, and in the repeating unit represented by formula (II), $R_4$ is preferably a lower alkyl group, such as methyl group or ethyl group.

The bonding manner of the repeating unit represented by formula (I) and the repeating unit represented by formula (II) is not particularly limited. Specific examples of the bonding manner can include random bonding, block bonding, alternate bonding, or graft bonding. Particularly, block bonding is preferred.

In addition, the styrene equivalent weight-average molecular weight measured by gel permeation chromatography is preferably in the range of 50,000 to 200,000, more preferably in the range of 100,000 to 200,000, and further preferably in the range of 100,000 to 160,000.

The ratio of styrene equivalent weight-average molecular weight and number-average molecular weight measured by gel permeation chromatography (Mw/Mn) is preferably in the range of 1.01 to 2.50, further preferably in the range of 1.01 to 1.50.

For the process for the production of the star polymer of the present invention, known processes for synthesizing a star polymer can be used. The star polymer of the present invention can be produced by either of a core-first process and an arm-first process, but the arm first process is preferred.

Specific example of raw material monomers used for the production of the star polymer of the present invention can include double bond-containing compounds represented by the following formulas (IV) and (V) corresponding to formulas (I) and (II).

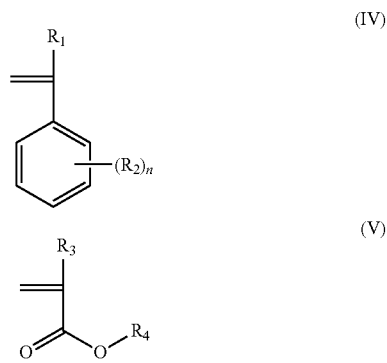

(wherein $R_1$ to $R_4$ each represents the same meaning as the above).

Specific examples of the compound represented by formula (IV) can include styrene, α-methylstyrene, 4-methoxystyrene, and 4-phenylstyrene.

Specific examples of the compound represented by formula (V) can include methyl acrylate, ethyl acrylate, n-propyl acrylate, isopropyl acrylate, n-butyl acrylate, isobutyl acrylate, s-butyl acrylate, t-butyl acrylate, n-pentyl acrylate, n-hexyl acrylate, n-heptyl acrylate, cyclopropyl acrylate, cyclobutyl acrylate, cyclohexyl acrylate, 1-ethylcyclohexyl acrylate, norbornyl acrylate, 1-adamantyl acrylate, 2-methyl-2-adamantyl acrylate; 1,1-dimethyl-1-adamantyl acrylate, tricyclodecanyl acrylate, isoboronyl acrylate, methyl methacrylate, ethyl methacrylate, n-propyl methacrylate, isopropyl methacrylate, n-butyl methacrylate, isobutyl methacrylate, s-butyl methacrylate, t-butyl methacrylate, n-pentyl methacrylate, n-hexyl methacrylate, n-heptyl methacrylate, cyclopropyl methacrylate, cyclobutyl methacrylate, cyclohexyl methacrylate, 1-ethylcyclohexyl methacrylate, norbornyl methacrylate, 1-adamantyl methacrylate, 2-methyl-2-adamantyl methacrylate, 1,1-dimethyl-1-adamantyl methacrylate, tricyclodecanyl methacrylate, and isoboronyl methacrylate.

Specific examples of the combination of the repeating units (I) to (III) constituting the copolymer of the present invention can include combinations as shown below. The repeating units are represented by monomers corresponding to them.

Specific examples of the combination can include styrene/methyl methacrylate/ethylene glycol dimethacrylate, styrene/ethyl methacrylate/ethylene glycol dimethacrylate, α-methylstyrene/methyl methacrylate/ethylene glycol dimethacrylate, and α-methylstyrene/ethyl methacrylate/ethylene glycol dimethacrylate.

The present invention will be described in more detail below by Examples, but the scope of the present invention is not limited to the Examples.

EXAMPLE 1

Under a nitrogen atmosphere, toluene (480 g), tetrahydrofuran (hereinafter abbreviated as THF) (120 g), and styrene (hereinafter abbreviated as ST) (61.4 g; 589 mmol) were added to a flask, and cooled to −40° C. A n-butyllithium (hereinafter abbreviated as n-BuLi) solution (7.37 g; 18 mmol) was added to this solution, and the mixture was stirred for 25 minutes. Then, diphenylethylene (3.58 g; 20 mmol) was added, and the mixture was stirred at the same temperature for 10 minutes. Next, a solution of THF (30 g) to which methyl methacrylate (hereinafter abbreviated as MMA) (14.9 g; 148 mmol), a diethylzinc hexane solution (6.66 g; 9 mmol), and lithium chloride (21.3 g; 19 mmol) were added was dropped over 10 minutes, and then, the mixture was stirred at the same temperature for 15 minutes. Then, a solution of THF (35 g) to which ethylene glycol dimethacrylate (hereinafter abbreviated as EGMA) (11.3 g; 57 mmol) and a diethylzinc hexane solution (3.85 g; 5 mmol) were added was dropped over 8 minutes, and then, the mixture was stirred for 30 minutes. This reaction solution was stirred for 140 minutes, while its temperature was increased to room temperature, and then, methanol was added to stop the reaction. The reaction solution was added to a large amount of methanol, and the precipitated polymer was filtered and dried. Next, a 15 wt % THF solution was made with this polymer, and methanol was added. The separated tar-like material was separated by separate funnel. Further, a 15 wt % THF solution was made with the obtained tar-like material, and a similar operation was repeated. The finally obtained tar-like material was dissolved in THF again to make a 20 wt % solution. This solution was added to a large amount of methanol, and the precipitated polymer was filtered and dried. The obtained polymer was measured by gel permeation chromatography. It was a monodisperse polymer having a styrene equivalent weight-average molecular weight (Mw) of 58,400 and a degree of dispersion (Mw/Mn) of 1.12. $^{13}$CNMR was measured, and it was found that the ST/MMA/EGMA molar ratio was 73/15/12.

EXAMPLE 2

Under a nitrogen atmosphere, toluene (470 g), THF (120 g), and ST (60.6 g; 582 mmol) were added to a flask, and cooled to −40° C. A n-BuLi solution (3.92 g; 9 mmol) was added to this solution, and the mixture was stirred for 25 minutes. Then, diphenylethylene (1.89 g; 11 mmol) was added, and the mixture was stirred for 10 minutes. Next, a solution of THF (35 g) to which MMA (14.8 g; 148 mmol), a diethylzinc hexane solution (4.60 g; 6 mmol), and lithium chloride (10.4 g; 9 mmol) were added was dropped over 6 minutes, and then, the mixture was stirred for 15 minutes. Then, a solution of THF (35 g) to which EGMA (6.14 g; 31 mmol) and a diethylzinc hexane solution (4.60 g; 6 mmol) were added was dropped over 6 minutes, and then, the mixture was stirred for 30 minutes. This reaction solution was stirred for 140 minutes, while its temperature was increased to room temperature, and then, methanol was added to stop the reaction. The reaction solution was added to a large amount of methanol, and the precipitated polymer was filtered and dried. Next, a 15 wt % THF solution was made with this polymer, and methanol was added. The separated tar-like material was separated by separate funnel. Further, a 15 wt % THF solution was made with the obtained tar-like material, and a similar operation was repeated. The finally obtained tar-like material was dissolved in THF again to make a 20 wt % solution. This solution was added to a large amount of methanol, and the precipitated polymer was filtered and dried. The obtained polymer was measured by gel permeation chromatography. It was a monodisperse polymer having a styrene equivalent weight-average molecular weight (Mw) of 100,500 and a degree of dispersion (Mw/Mn) of 1.08. $^{13}$CNMR was measured, and it was found that the ST/MMA/EGMA molar ratio was 80/17/3.

EXAMPLE 3

Under a nitrogen atmosphere, toluene (480 g), THF (130 g), and ST A61.3 g; 589 mmol) were, added to a flask, and cooled to −40° C. A n-BuLi solution (2.44 g; 6 mmol) was added to this solution, and the mixture was stirred for 25 minutes. Then, diphenylethylene (1.2 g; 7 mmol) was added, and the mixture was stirred for 10 minutes. Next, a solution of THF (30 g) to which MMA (14.7 g; 147 mmol), a diethylzinc hexane solution (5.12 g; 7 mmol), and lithium chloride (6.72 g; 6 mmol) were added was dropped over 5 minutes, and then, the mixture was stirred for 15 minutes. Then, a solution of THF (30 g) to which EGMA (3.46 g; 18 mmol) and a diethylzinc hexane solution (3.67 g; 5 mmol) were added was dropped over 5 minutes, and then, the mixture was stirred for 30 minutes. This reaction solution was stirred for 140 minutes, while its temperature was increased to room temperature, and then, methanol was added to quench the reaction. The reaction solution was added to a large amount of methanol, and the precipitated polymer was filtered and dried. Next, a 15 wt % THF solution was made with this polymer, and methanol was added, then the separated tar-like material was separated by separate funnel. Further, a 15 wt % THF solution was made with the obtained tar-like material, and a similar operation was repeated. The finally obtained tar-like material was dissolved in THF again to make a 20 wt % solution. This solution was added to a large amount of methanol, and the precipitated polymer was filtered and dried. The obtained polymer was measured by gel permeation chromatography. It was a monodisperse polymer having a styrene equivalent weight-average molecular weight (Mw) of 155,200 and a degree of dispersion (Mw/Mn) of 1.09. $^{13}$CNMR was measured, and it was found that the ST/MMA/EGMA molar ratio was 79/19/2.

INDUSTRIAL APPLICABILITY

According to the present invention, it is possible to provide a polymer excellent in heat resistance, crack resistance, high temperature adhesiveness, adhesion properties, and the like, used for chip stacking adhesives and the like.

The invention claimed is:

1. A star polymer comprising, as an arm portion, a polymer chain consisting of repeating units represented by formula (I) and formula (II):

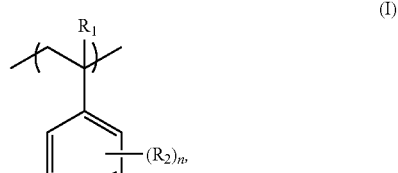

(I)

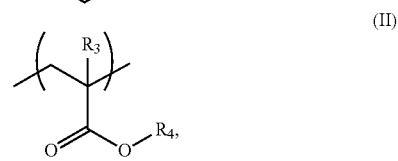

(II)

wherein $R_1$ represents a hydrogen atom or a methyl group, $R_2$ represents an alkyl group, an alkoxy group, or an aryl group, $R_3$ represents a methyl group, $R_4$ represents an alkyl group which may have a hydroxy group, or a cycloalkyl group, and n represents any integer of 0 to 3, and comprising a core portion derived from a monomer represented by formula (III):

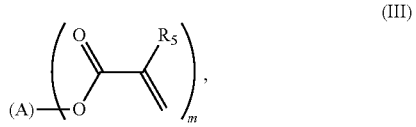
(III)

wherein (A) represents an m-valent linking group, $R_5$ represents a hydrogen atom or a methyl group, and m represents an integer of 2 or more, wherein a molar ratio of the repeating unit represented by formula (I) to the repeating unit represented by formula (II) ((I)/(II)) in the arm portion is in the range of 60/40 to 95/5.

2. The star polymer according to claim 1, wherein the molar ratio of the repeating unit represented by formula (I) to the repeating unit represented by formula (II) ((I)/(II)) in the arm portion is in the range of 80/20 to 95/5.

3. The star polymer according to claim 1, wherein the repeating unit represented by formula (I) and the repeating unit represented by formula (II) are bonded by block bonding.

4. The star polymer according to claim 1, wherein styrene equivalent weight-average molecular weight measured by gel permeation chromatography is in the range of 50,000 to 200,000.

5. The star polymer according to claim 1, wherein a ratio of styrene equivalent weight-average molecular weight (Mw) and number-average molecular weight (Mn) measured by gel permeation chromatography (Mw/Mn) is in the range of 1.01 to 1.50.

* * * * *